United States Patent
Carlson

(10) Patent No.: US 9,354,715 B2
(45) Date of Patent: May 31, 2016

(54) DYNAMIC ARRANGEMENT OF CHARACTERS IN AN ON-SCREEN KEYBOARD

(75) Inventor: Jay Carlson, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 876 days.

(21) Appl. No.: 11/279,549

(22) Filed: Apr. 12, 2006

(65) Prior Publication Data

US 2007/0245259 A1 Oct. 18, 2007

(51) Int. Cl.
*G06F 3/00* (2006.01)
*G06F 3/023* (2006.01)

(52) U.S. Cl.
CPC ............ *G06F 3/0237* (2013.01); *G06F 3/0236* (2013.01)

(58) Field of Classification Search
CPC ........................................................ G06F 3/00
USPC .......................................... 715/263, 773, 783
See application file for complete search history.

(56) References Cited

U.S. PATENT DOCUMENTS

| 4,999,795 | A | * | 3/1991 | Lapeyre | 708/146 |
|---|---|---|---|---|---|
| 5,031,119 | A | * | 7/1991 | Dulaney et al. | 715/773 |
| 5,067,103 | A | * | 11/1991 | Lapeyre | 708/146 |
| 5,128,672 | A | * | 7/1992 | Kaehler | 341/23 |
| 5,724,449 | A | | 3/1998 | Cornerford | |
| 5,963,671 | A | * | 10/1999 | Comerford et al. | 382/230 |
| 5,973,665 | A | | 10/1999 | Davie et al. | |
| 6,011,542 | A | * | 1/2000 | Durrani et al. | 345/156 |
| 6,377,966 | B1 | * | 4/2002 | Cooper et al. | 715/263 |
| 6,621,424 | B1 | * | 9/2003 | Brand | 341/22 |
| 6,664,982 | B1 | * | 12/2003 | Bi | 715/773 |
| 7,098,896 | B2 | * | 8/2006 | Kushler et al. | 345/168 |
| 7,130,846 | B2 | * | 10/2006 | Danker et al. | 707/3 |
| 7,155,683 | B1 | * | 12/2006 | Williams | 715/816 |
| 7,168,046 | B2 | * | 1/2007 | Kang et al. | 715/773 |
| 7,286,115 | B2 | | 10/2007 | Longe et al. | |

(Continued)

FOREIGN PATENT DOCUMENTS

| JP | 2001-184316 | 7/2001 |
|---|---|---|
| JP | 2004-038896 | 2/2004 |

OTHER PUBLICATIONS

Kajikawa Tomoya, casio comput co ltd (JP 2001-184316), Detailed Description of the Invention English translation document.*

(Continued)

*Primary Examiner* — Amy Ng
*Assistant Examiner* — Meseker Takele
(74) *Attorney, Agent, or Firm* — Fitch, Even, Tabin & Flannery, LLP

(57) ABSTRACT

The characters on an on-screen keyboard are dynamically rearranged to facilitate text entry based on context. Specifically, a home position is established among a plurality of characters displayed on the screen. A user's selection of one of the characters is received by the system, and then the characters are rearranged with respect to the home position in response to the user's selection. The rearranging may be based on the next statistically most likely characters to be selected based on what characters the user has already entered. Statistical analysis of a word list may be applied to the text already entered by the user and then the characters displayed on the keyboard are reordered to place the most likely desired character under or near the cursor. The other characters may be arranged in order of probability of selection from the home or starting position for the cursor.

33 Claims, 5 Drawing Sheets

(56) References Cited

U.S. PATENT DOCUMENTS

| | | |
|---|---|---|
| 7,337,410 B2* | 2/2008 | Lin .............................. 715/773 |
| 7,475,417 B2* | 1/2009 | Marsh ............................ 725/58 |
| 7,487,461 B2* | 2/2009 | Zhai et al. ..................... 715/773 |
| 7,574,672 B2 | 8/2009 | Jobs et al. |
| 2002/0054120 A1* | 5/2002 | Kawano et al. ............... 345/773 |
| 2002/0085038 A1* | 7/2002 | Cobbley et al. ............... 345/773 |
| 2003/0112277 A1* | 6/2003 | Shteyn .......................... 345/773 |
| 2004/0021696 A1* | 2/2004 | Molgaard ..................... 345/810 |
| 2005/0195159 A1 | 9/2005 | Hunleth et al. |
| 2007/0046641 A1* | 3/2007 | Lim .............................. 345/173 |
| 2011/0099506 A1* | 4/2011 | Gargi et al. ................... 715/773 |

OTHER PUBLICATIONS

Bellman, et al., "A Probabilistic Character Layout Strategy for Mobile Text Entry", Proceedings of Graphics Interface, 1998, pp. 168-176.

Felzer, et al., "Alternative Text Entry Using Different Input Methods", Assets '06, Oct. 22-25, 2006. Portland, Oregon, USA, 8 pages.

* cited by examiner

— DYNAMIC ARRANGEMENT OF CHARACTERS IN AN ON-SCREEN KEYBOARD

BACKGROUND OF THE INVENTION

1. Field of the Invention

The present invention relates generally to text and data entry into computer systems such as computer entertainment systems, and more specifically to on-screen keyboards.

2. Discussion of the Related Art

Computer entertainment game systems have become some of the most successful consumer electronics products to hit store shelves in recent years. Such systems often require the entry of text even though their controllers typically do not include a full physical QWERTY type keyboard. Therefore, such systems typically make use of on-screen keyboards.

With an on-screen keyboard, the characters are displayed on the screen, and the user selects the character to be entered by using the game controller to position the cursor on the character to be selected.

It is with respect to these and other background information factors that the present invention has evolved.

SUMMARY OF THE INVENTION

The present invention advantageously addresses the needs above as well as other needs by providing a method for use in data entry. The method comprises the steps of: displaying a plurality of characters on a screen; establishing a home position among the characters; receiving a user's selection of one of the characters; and rearranging one or more of the characters with respect to the home position in response to the user's selection.

Another embodiment of the present invention provides a computer program product comprising a medium for embodying a computer program for input to a computer. A computer program is embodied in the medium for causing the computer to perform steps of: displaying a plurality of characters on a screen; establishing a home position among the characters; receiving a user's selection of one of the characters; and rearranging one or more of the characters with respect to the home position in response to the user's selection.

Another embodiment of the present invention provides a system for use in data entry. The system comprises: means for displaying a plurality of characters on a screen; means for establishing a home position among the characters; means for receiving a user's selection of one of the characters; and means for rearranging one or more of the characters with respect to the home position in response to the user's selection.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

Entering text without an actual physical keyboard can be difficult and time consuming given just an on-screen keyboard. On-screen keyboards are typically either of the QWERTY or ABCDEF . . . layout forms. This causes problems when the next character that the user needs to enter is on the other side of the "keyboard".

Embodiments of the present invention provide for an on-screen keyboard that changes the order of the keys to make text entry faster and easier for the user. Namely, the characters on an on-screen keyboard are dynamically rearranged to facilitate text entry based on context. Because the user views the keyboard on the screen and is usually looking at the keyboard, there is no reason that the characters on the keyboard cannot be rearranged to make text entry faster and easier for the user.

Figure 1:
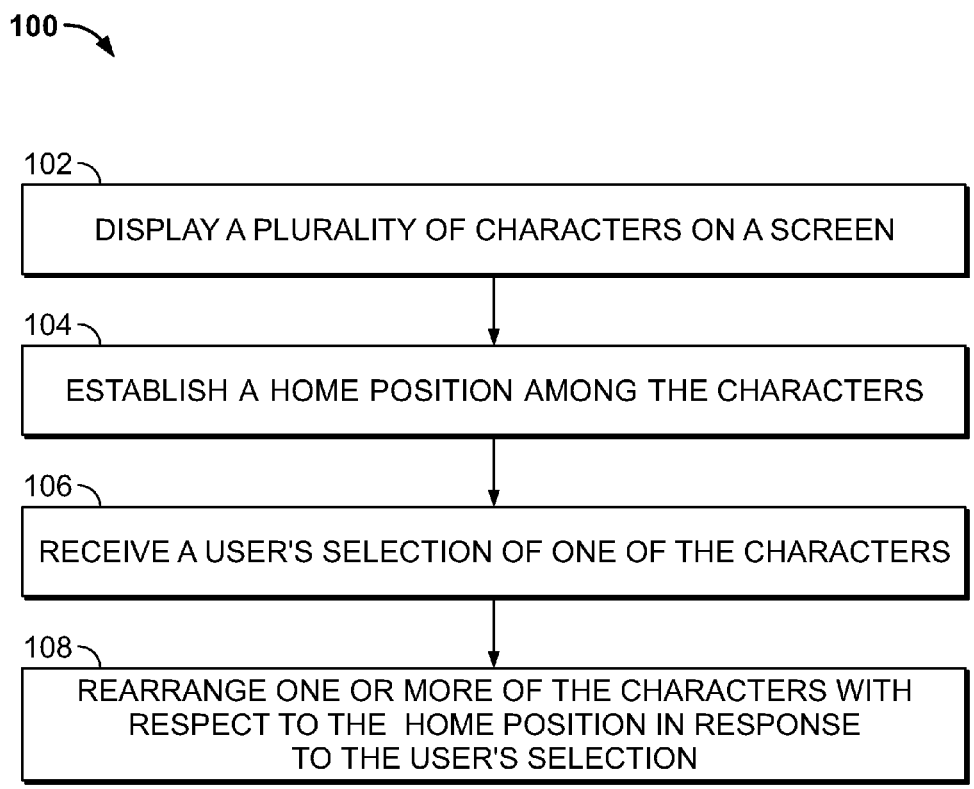
FIG. 1 is a flow diagram illustrating a method for use in data entry in accordance with an embodiment of the present invention.

Referring to FIG. 1, there is illustrated a method 100 that operates in accordance with an embodiment of the present invention. The method 100 may be used in the entry of any type of data such as for example the entry of text, letters or any other such characters, symbols, etc. The word "characters" as used herein is intended to include all such letters, text, symbols, etc.

In step 102 a plurality of characters are displayed on a screen, such as the video display screen of an entertainment system or similar device. The characters may be displayed in any desired pattern, some examples of which will be described below.

In step 104 a home position is established among the characters. The home position is where the cursor will initially be positioned and where the cursor will return to after the user has selected a character. The home position may be in any desired or convenient location.

In step 106 the system receives the user's selection of one of the characters. The user selects a character by using a controller, such as a hand-held controller, or similar input device for the system to position the cursor on the character to be selected. The user then presses the appropriate button on the controller for selecting the character.

In step 108 one or more of the characters are rearranged with respect to the home position in response to the user's selection of a character. The rearranging is preferably based on the next statistically most likely characters to be selected based on what characters the user has already entered. Namely, statistical analysis of a word list is applied to the text already entered by the user and then the characters displayed on the keyboard are reordered to place the most likely desired character under or near the cursor. The other characters may be arranged in order of probability of selection from the home or starting position for the cursor. For example, a next statistically most likely character to be selected is placed in the home position, a second next statistically most likely character to be selected is placed in a position next to the home position, a third next statistically most likely character to be selected is placed in a position next to that, and so on.

Figure 2A:
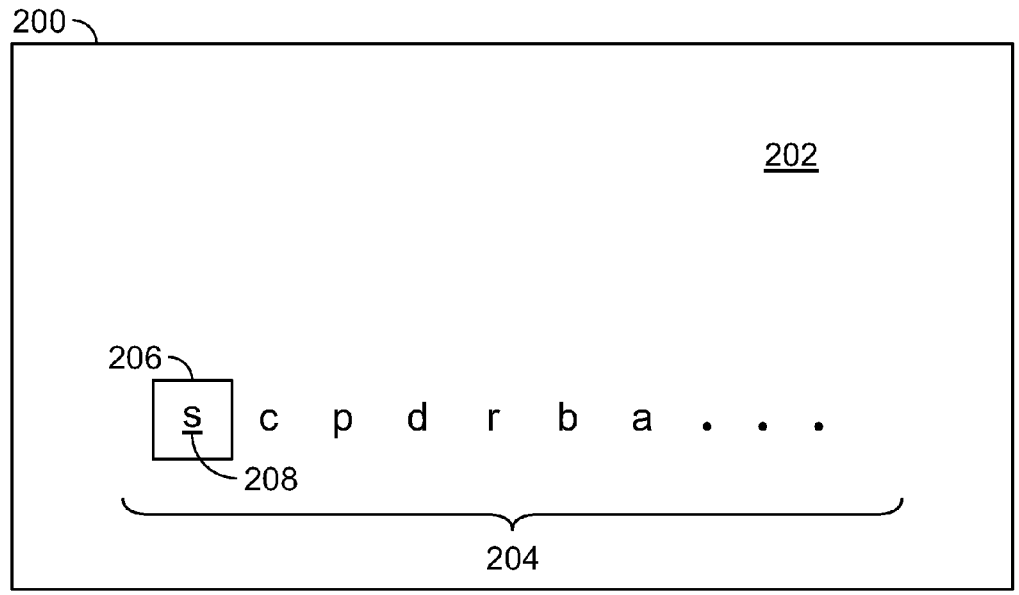
FIGS. 2A, 2B, 2C, 2D and 2E are screen shots illustrating an example application of the method shown in FIG. 1 in accordance with an embodiment of the present invention.

FIGS. 2A-2E illustrate an example application of a method for use in data entry in accordance with an embodiment of the present invention. Specifically, FIG. 2A illustrates a screen 200, such as the display screen for an entertainment system, having an on-screen keyboard 202 displayed thereon. The on-screen keyboard 202 includes a plurality of characters 204. The characters 204 are illustrated as being arranged in a straight line, but it should be understood that they may be arranged in any desired pattern. A home position 206 is established among the characters, which may be in any desired location, such as for example at the beginning of the character line as shown. The cursor 208 is initially positioned in the home position 206.

Figure 2B:
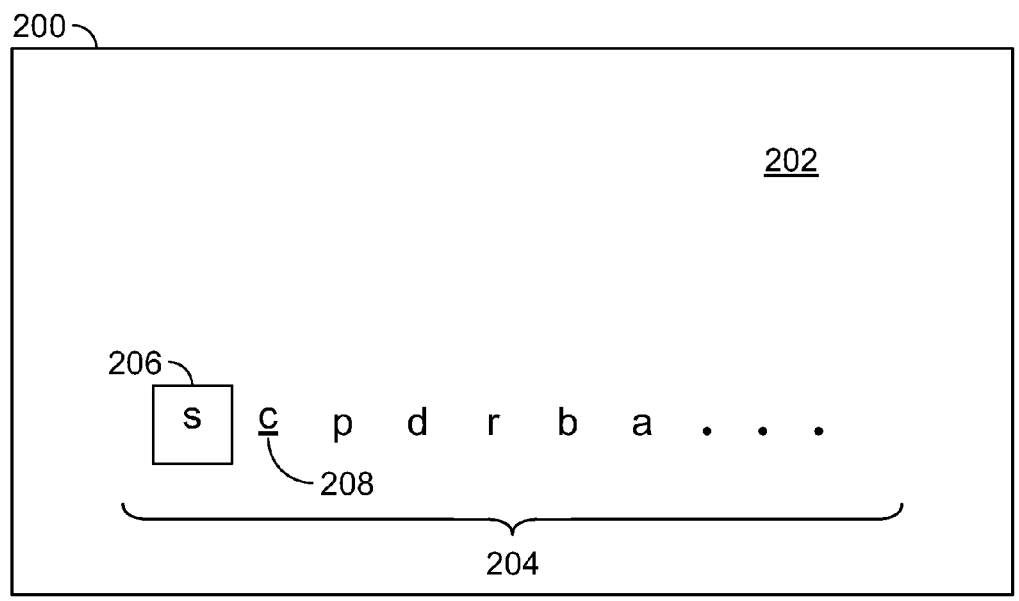
Figure 2C:

If the user were to be entering the word "champion," the keyboard would initially be set up with the order of the letters as "s c p d r b a . . . " because those letters have the most words that start with that letter. In order to enter the letter "c", the user uses the handheld controller to move the cursor 208 one space to the right as shown in FIG. 2B and then selects the "c". After the user makes this selection the keyboard resets the cursor 208 back to the home position 206 and reorders the keyboard as "o a h e i t k . . . " as those are the most likely letters to be needed after the character "c". The "o" is positioned on/under the cursor 208 in the home position 206, as is shown in FIG. 2C. The text entered by the user so far is indicated at 210, which at this point is only the letter "c".

Figure 2D:
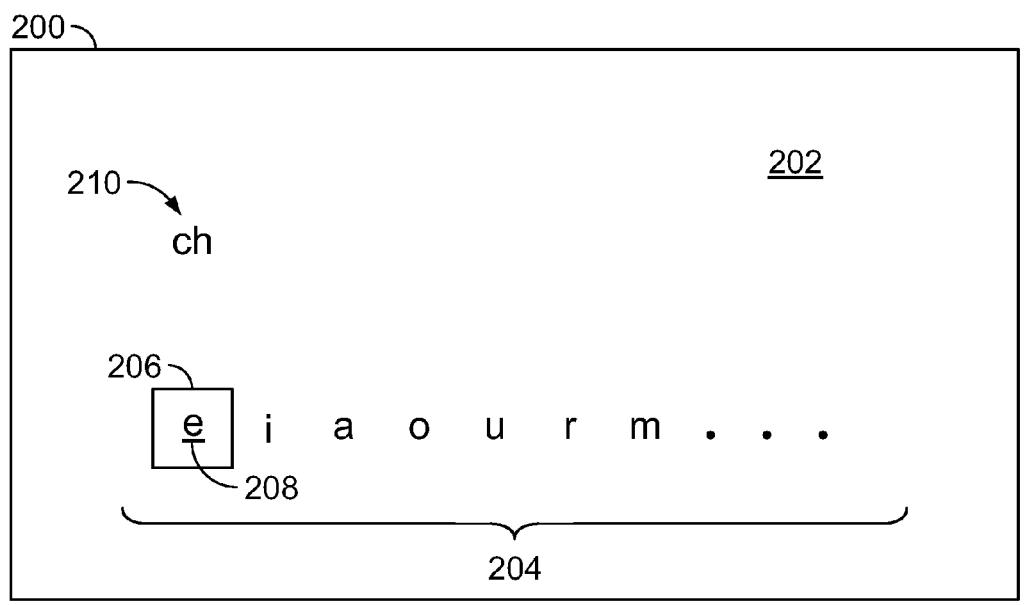

In order to enter the letter "h", the user uses the handheld controller to move the cursor 208 two spaces to the right and then selects the "h". After the user makes this selection the keyboard resets the cursor 208 back to the home position 206 and reorders the keyboard as "e i a o u r m . . . " as those are the most likely letters to be needed after the character sequence "ch". The "e" is positioned on/under the cursor 208 in the home position 206, as is shown in FIG. 2D. Again, the text entered by the user so far is indicated at 210.

Figure 2E:
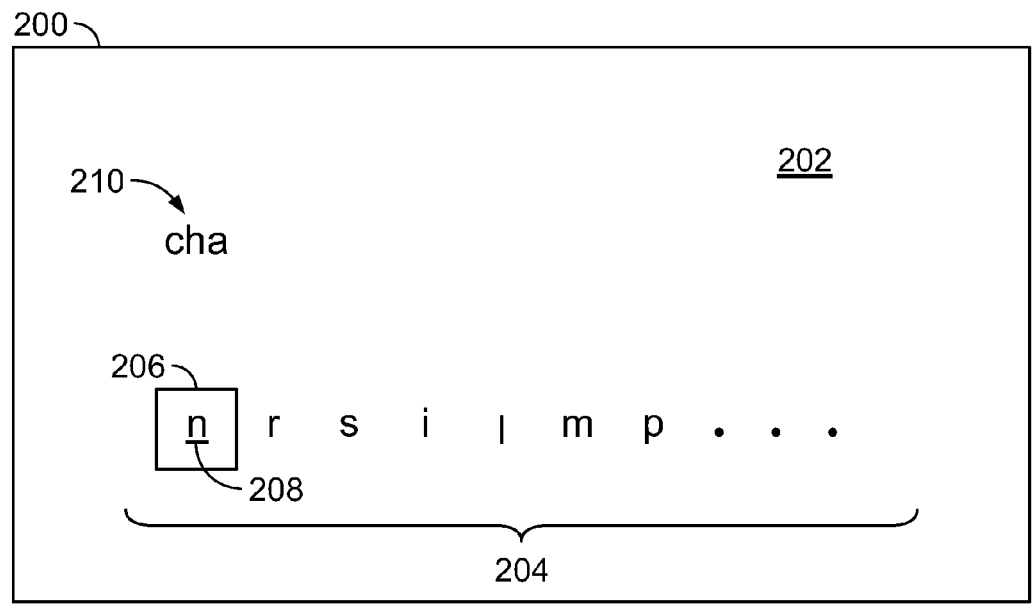

In order to enter the letter "a", the user uses the handheld controller to move the cursor 208 two spaces to the right and then selects the "a". After the user makes this selection the keyboard resets the cursor 208 back to the home position 206 and reorders the keyboard as "n r s i l m p . . . " as those are the most likely letters to be needed after the character sequence "cha". The "n" is positioned on/under the cursor 208 in the home position 206, as is shown in FIG. 2E. Again, the text entered by the user so far is indicated at 210.

This process repeats itself as the user enters the rest of the letters in the word "champion".

Figure 3:
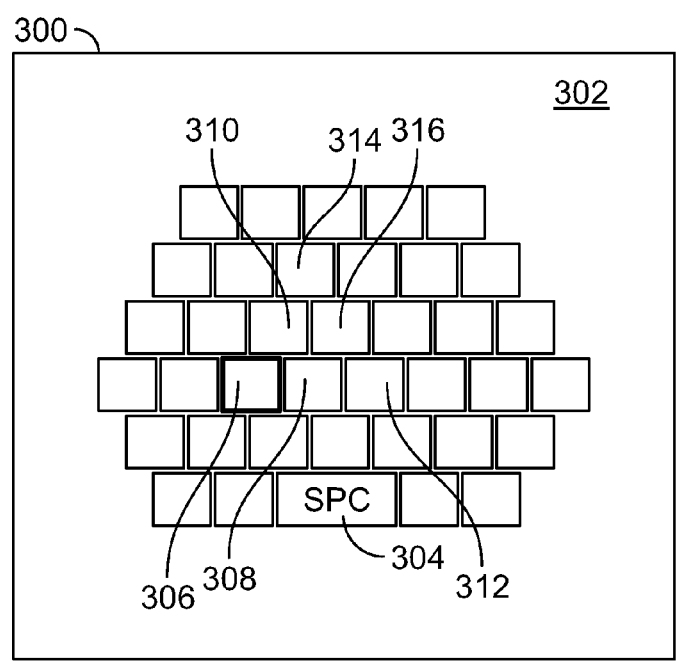
FIG. 3 is a screen shot illustrating an example layout of an on-screen keyboard in accordance with an embodiment of the present invention.

It was mentioned above that the plurality of characters displayed on the screen may be displayed in any desired pattern. Referring to FIG. 3, there is illustrated an example of one such pattern in accordance with an embodiment of the present invention.

Specifically, there is displayed on the screen 300 a keyboard 302 that includes thirty-eight characters or "keys." The cursor may initially start in one of two places, depending on context. It may start on the space character 304 if the last character entered was a period (.) or a comma (,). Otherwise, the cursor may initially start on the home position 306 character. All letters would move outward from the home position 306 based on probability of use. That is, the statistical probability of being the next character selected determines the number of steps away from the home position 306. By way of example, the home position 306 will typically correspond to the most likely letter to be needed, key 308 to the right may correspond to the second most likely letter to be needed, key 310 above may correspond to the third most likely letter to be needed, key 312 two steps to the right may correspond to the fourth most likely letter to be needed, key 314 two steps above may correspond to the fifth most likely letter to be needed, and key 316 up and to the right may correspond to the sixth most likely letter to be needed, and so on. It should be well understood, however, that this is just one example ordering of the keys and that many different orderings may be used in accordance with embodiments of the present invention. Other characters, such as for punctuation and other common characters, may remain in fixed locations.

By way of example, the keyboard 302 could be used with computer entertainment systems or the like in conjunction with the standard hand-held controller buttons. For other types of systems and devices additional "keys" may be added for functions such as SHIFT, ENTER, etc.

Many different techniques and methods may be used in accordance with embodiments of the present invention to determine the next statistically most likely characters to be selected. For example, as mentioned above statistical analysis of a word list may be used. Namely, statistical analysis of the words in a word list may be used to generate a table of character sequences that may be applied to the text already entered by the user.

An example of the data generation process will now be provided. This example uses an English word list, but it should be well understood that word lists for many different languages could be used. Furthermore, different word lists for the same language may have variations, which means results may vary. Such word lists are widely available and are easily obtainable, such as for example on the Internet. The English word list used in the following example is believed to be a practical sampling of data and may be found on the Internet at: http://wordlist.sourceforge.net, in the "Official 12Dicts Package" (http://prdownloads.sourceforge.net/wordlist/12dicts-4.0.zip), with the specific word list being the "2of12inf.txt" file, with the annotations removed (see the readme.txt in the zip file). This word list is fully incorporated herein by reference in its entirety. But again, it should be well understood that any word list may be used to generate the data in accordance with embodiments of the present invention.

For a given word list, which could be several hundred Kilo bytes or even Mega bytes in length, the amount of raw data is preferably first reduced to manageable levels. This may be done by searching the word list for all letters and counting them. Then the word list is searched for sequences of letters and the number of occurrences of the sequences are counted, e.g. aa, ab, ac, ad . . . aaaa, aaab, aaac . . . zzzx, zzzy, zzzz.

The character sequences that are searched and counted may include sequences that are two letters in length, three letters in length, four letters in length, five letters in length, six letters in length, and so on. However, the number of possible combinations grows very fast with each longer character sequence, i.e. similar to $26, 26^2, 26^3, 26^4, 26^5$, etc. This means the table of character sequences that is generated would become quite large and require a large amount of memory for storage. As such, it has been found by the inventor hereof that searching and counting character sequences that are two, three and four characters long provides a reasonable balance between data size and accuracy in determining the next statistically most likely characters to be selected.

The table of character sequences, or sequence order list, may be assembled by listing all of the two, three and four letter sequences and then listing the percentage of occurrence next to each sequence. Thus, the percentage of occurrence may be used as the probability that the last character in the sequence will follow the previous characters. This is applied to the text already entered by the user by finding in the sequence order list all the occurrences of the sequence of characters entered by the user plus one extra character. The corresponding percentage of occurrence is the probability that the one extra character will follow the sequence of characters already entered by the user.

Again, the sequence of characters used could be extended beyond four characters, but the number of possible combinations becomes very large. Furthermore, it is envisioned that analysis on data reduction could be performed to reduce the size of the sequence order list. For example, the three letter sequence of "aba" may do just as well on its own than for longer sequences like "llaba", which is used in only eight words like "bouillabaisse". Thus, as the length of the sequences increases, the number of sequences increases, but the number of actual unique sequences decreases. For example, "agxtrc" is not used in any word.

In addition to the sequence order data, an additional table of special sequences could be also tested against the user's entries. For example, after any apostrophe (') the keyboard could be ordered with the "s" and "t" letters under and near the cursor in the home position. After any "." or "," or "?" the cursor could be positioned on the SPACE character.

The data in the generated table of character sequences may be output in the form of a hash table for fast lookup at runtime.

An explanation of an example practical use of the above-described techniques will now be provided. By way of example, say that the user wanted to enter the phrase "Bougainvilleas will be planted where the rose bushes were." A few iterations will be provided here, and not the entire sentence, and ignoring capitalization.

On initially starting, there is no character history to work with, so the keyboard can be arranged in order of starting letter probability. That is, there are more words in many word lists that start with the letter "s" than any other letter. Therefore, the keyboard would be arranged in the order:

"scpdrbamtfiehgluwonvjkqyzx"

The cursor would initially start in its home position with the letter "s" under it, and propagating outward from that position would be the other letters in this order of probable need/use. This order is the descending order of probability of the letters being used as the first letter of words in the word list used for this example. Of course, many different word lists may be used for practicing the present invention in generating the sequence order list, etc. As mentioned above, because different word lists may have variations, results such as the starting letter percentages for the words may vary.

In order to enter the first letter of the word "bougainvilleas", the user would have to move the cursor only five steps to reach the "b" and select it. After the selection the cursor is reset to the home position and the keyboard letters are rearranged based on probability to:

"laeiorubsytjdmncvfhpwgkzxq"

That is, from the sample word list there are twenty four letters that can follow a "b" with no words having a "x" or a "q" afterward. In order to make the keyboard complete, the "x" and "q" are added to the end of the list of letters. The cursor is positioned in the home position under the first letter "l".

Continuing with the letter entry, the user would now find "o" which is four steps away from the home position and select it. After the selection the cursor is again reset to the home position and the keyboard letters are now rearranged based on probability to:

"oarunlwtxdysbmigcpehfvjkzxq"

That is, from the sample word list there are twenty-five letters that can follow the character sequence "bo" with no words having a "q" afterward. In order to make the keyboard complete, the "q" is added to the end of the list of letters.

Next, the user finds the "u" which is three steps away from the home position and selects it. The keyboard now rearranges itself to:

"nrtcglisdfqzeaoupmhbyvkwxj"

That is, from the sample word list there are twelve letters found that follow the character sequence "bou". The remaining letters are appended to this list, with the ordering based on the probability of overall letter usage in the word list.

Next, the user finds the "g" which is four steps away from the home position and selects it. The keyboard now rearranges itself, based on the three letter sequence of "oug" to:

"heaisnrtolcdugpmbyfvkwzxqj"

The rearrangement is based on the three letter sequence of "oug" because in this example the longest sequences included in the sequence order list are four characters in length. This means that only the most recent three characters entered by the user can be used with the sequence order list to determine the next most probable letters to be selected. There are only four letters found to follow the sequence "oug", those being "heai". The other letters are again appended to the order list in, for example, the order of their general popularity of use in words.

The user now moves two spaces from the home position to select the "a". The keyboard then rearranges itself based on "uga" to:

"trlbiseanocdugpmhyfvkwzxqj"

This process continues so the user can enter all of the desired text.

The word "Bougainvilleas" is an interesting choice of words for this sample, as none of the next letters for entry mentioned so far was directly under the cursor at the home position for entry, although that would happen twice while entering the entire word at the "n" and at the final "s". On the down side, the letter "v" after the sequence "ain" is the least likely letter, with 19 letters beforehand, so it would be several steps away.

It is envisioned that a word completion feature may be used in conjunction with embodiments of the present invention. Word completion is a feature whereby a list of possible words that fit the already entered text is provided after each letter is entered. Such word completion features, however, require additional memory to store the given word list. If one were to add a word completion feature in the above example, "bougainvillea" would pop up after entering the four letters "boug" with "bougainvilleas" as the next word.

The methods and techniques described herein may be used in connection with computer entertainment systems and the like and numerous types of video games, movies, videos, animations, cartoons, etc. The methods and techniques described herein may be utilized, implemented and/or run on many different types of computers, graphics workstations, video game systems, DVD players, DVRs, media players, home servers, video game consoles, cell phones, portable devices, wireless devices and the like.

Figure 4:
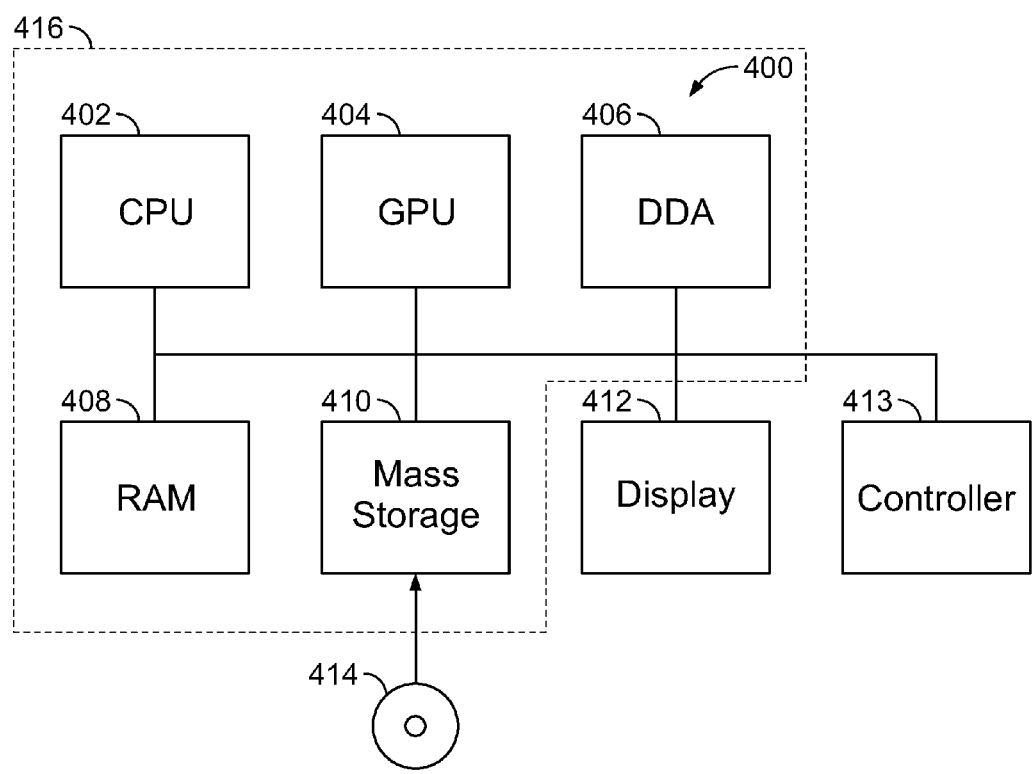
FIG. 4 is a block diagram illustrating a system that may be used to run and execute the methods and techniques described here in accordance with embodiments of the present invention.

Referring to FIG. 4 there is illustrated such a system 400 that may be used to implement and/or run the methods and techniques described herein. The system 400 may, for example, include a central processing unit (CPU) 402, a graphics processing unit (GPU) 404, digital differential analysis (DDA) hardware 406, a random access memory (RAM) 408, a mass storage unit 410, such as a disk drive, a display monitor 412, and a hand-held controller 413.

The CPU 402 and/or GPU 404 can be used to execute the steps of the methods and techniques described herein, and the images for the on-screen keyboard, etc. can be rendered on the display monitor 412. Removable storage media 414 may optionally be used with the mass storage unit 410, which may be used for storing code that implements the methods and techniques described herein. However, any of the storage devices, such as the RAM 408 or mass storage unit 410, may be used for storing such code. Either all or a portion of the system 400 may be embodied in a device 416, such as for example a computer or video game console or system. Simulations and/or processing may be run concurrently with other graphics tasks. On a multi processing core, simulations can be executed on a separate processor.

While the invention herein disclosed has been described by means of specific embodiments and applications thereof, numerous modifications and variations could be made thereto by those skilled in the art without departing from the scope of the invention set forth in the claims.

What is claimed is:

1. A method for use in data entry, comprising the steps of:
    displaying a plurality of characters on a screen;
    establishing a home position among the characters;
    receiving a user's selection of one of the characters; and
    rearranging one or more of the characters with respect to the home position in response to the user's selection;
    wherein the step of rearranging comprises the step of:
    determining a probable character to be selected using a table of character sequences that comprises character sequences that are two and three characters long and character sequences including one or more punctuation marks;
    in the event that the probable character is a letter, placing the probable character to be selected in the home position; and
    in the event that the probable character is a space, automatically placing a cursor on a space character.

2. A method in accordance with claim 1, wherein the step of rearranging comprises the step of:
    rearranging the one or more of the characters with respect to the home position based on a probable character to be selected.

3. A method in accordance with claim 1, wherein the step of rearranging further comprises the step of:
    placing a second probable character to be selected in a position next to the home position.

4. A method in accordance with claim 1, wherein the step of rearranging comprises the step of:
    arranging the one or more of the characters in order of probability of selection from the home position.

5. A method in accordance with claim 1, further comprising the step of:
    displaying the cursor on the screen that is initially positioned in the home position.

6. A method in accordance with claim 1, further comprising the step of:
    resetting the cursor to the home position after receiving the user's selection of one of the characters.

7. A method in accordance with claim 1, wherein the characters comprise alphanumeric characters.

8. A method in accordance with claim 1, wherein a first five of the plurality of characters comprise "s", "c", "p", "d" and "r" and which are initially displayed in that order with "s" being in the home position.

9. A method in accordance with claim 1, further comprising:
    placing a character having a high starting letter probability in the home position.

10. A method in accordance with claim 1, wherein the plurality of characters displayed on the screen are displayed in a pattern having a plurality of rows of characters.

11. A method in accordance with claim 1, wherein the table of character sequences further comprises character sequences that are four or more characters long.

12. A computer program product comprising a non-transitory medium for embodying a computer program for input to a computer and a computer program embodied in the medium for causing the computer to perform steps comprising:
    displaying a plurality of characters on a screen;
    establishing a home position among the characters;
    receiving a user's selection of one of the characters; and
    rearranging one or more of the characters with respect to the home position in response to the user's selection;
    wherein the step of rearranging comprises the step of:
    determining a probable character to be selected using a table of character sequences that comprises character sequences that are two and three characters long and character sequences including one or more punctuation marks;
    in the event that the probable character is a letter, placing the probable character to be selected in the home position; and
    in the event that the probable character is a space, automatically placing a cursor on a space character.

13. A computer program product in accordance with claim 12, wherein the step of rearranging comprises the step of:
    rearranging the one or more of the characters with respect to the home position based on a probable character to be selected.

14. A computer program product in accordance with claim 12, wherein the step of rearranging further comprises the step of:
    placing a second probable character to be selected in a position next to the home position.

15. A computer program product in accordance with claim 12, wherein the step of rearranging comprises the step of:
    arranging the one or more of the characters in order of probability of selection from the home position.

16. A computer program product in accordance with claim 12, further comprising the step of:
    displaying the cursor on the screen that is initially positioned in the home position.

17. A computer program product in accordance with claim 12, further comprising the step of:
    resetting the cursor to the home position after receiving the user's selection of one of the characters.

18. A computer program product in accordance with claim 12, further comprising the step of:
    placing a character having a high starting letter probability in the home position.

19. A computer program product in accordance with claim 12, wherein the plurality of characters displayed on the screen are displayed in a pattern having a plurality of rows of characters.

20. A computer program product in accordance with claim 12, wherein the table of character sequences further comprises character sequences that are four or more characters long.

21. An apparatus that includes a system for use in data entry, comprising:
    means for displaying a plurality of characters on a screen;
    means for establishing a home position among the characters;
    means for receiving a user's selection of one of the characters; and means for rearranging one or more of the characters with respect to the home position in response to the user's selection;
wherein the means for rearranging comprises:
means for determining a probable character to be selected using a table of character sequences that comprises character sequences that are two and three characters long and character sequences including one or more punctuation marks;
means for placing the probable character to be selected in the home position in the event that the probable character is a letter; and
means for automatically placing a cursor on a space character in the event that the probable character is a space.

22. An apparatus in accordance with claim 21, wherein the means for rearranging comprises:
means for rearranging the one or more of the characters with respect to the home position based on a probable character to be selected.

23. An apparatus in accordance with claim 21, wherein the means for rearranging further comprises:
means for placing a second probable character to be selected in a position next to the home position.

24. An apparatus in accordance with claim 21, wherein the means for rearranging comprises:
means for arranging the one or more of the characters in order of probability of selection from the home position.

25. An apparatus in accordance with claim 21, further comprising:
means for displaying the cursor on the screen that is initially positioned in the home position.

26. An apparatus in accordance with claim 21, further comprising:
means for resetting the cursor to the home position after receiving the user's selection of one of the characters.

27. An apparatus in accordance with claim 21, further comprising:
means for placing a character having a high starting letter probability in the home position.

28. An apparatus in accordance with claim 21, wherein the plurality of characters displayed on the screen are displayed in a pattern having a plurality of rows of characters.

29. An apparatus in accordance with claim 21, wherein the table of character sequences further comprises character sequences that are four or more characters long.

30. An apparatus, comprising:
a processing unit;
a memory coupled to the processing unit; and
a display coupled to the processing unit;
wherein the processing unit, memory, and display are configured to display a plurality of characters on a screen, establish a home position among the characters, receive a user's selection of one of the characters, and rearrange one or more of the characters with respect to the home position in response to the user's selection; and
wherein the rearranging comprises
determining a probable character to be selected using a table of character sequences that comprises character sequences that are two and three characters long and character sequences including one or more punctuation marks,
in the event that the probable character is a letter, placing a probable character to be selected in the home position; and
in the event that the probable character is a space, automatically placing a cursor on a space character.

31. An apparatus in accordance with claim 30, wherein the processing unit, memory, and display are further configured to place a character having a high starting letter probability in the home position.

32. An apparatus in accordance with claim 30, wherein the plurality of characters displayed on the screen are displayed in a pattern having a plurality of rows of characters.

33. An apparatus in accordance with claim 30, wherein the table of character sequences further comprises character sequences that are four or more characters long.

\* \* \* \* \*